United States Patent [19]

Heytmeijer

[11] 4,435,284

[45] Mar. 6, 1984

[54] RECOVERY OF MERCURY FROM SCRAP GLASS

[75] Inventor: Herman R. Heytmeijer, Hanover, N.J.

[73] Assignee: North American Philips Electric Corp., New York, N.Y.

[21] Appl. No.: 405,478

[22] Filed: Aug. 5, 1982

[51] Int. Cl.$^3$ .............................................. B03B 1/00
[52] U.S. Cl. ....................................... 209/3; 209/10; 209/12; 209/15; 210/914
[58] Field of Search ....................... 209/213, 5, 10, 12, 209/15, 16; 65/28; 75/0.5 R; 210/914, 714, 205

[56] References Cited

U.S. PATENT DOCUMENTS 3,550,869 12/1970 Carter .................................. 209/15

Primary Examiner—Bernard Nozick

[57] ABSTRACT

A process for removing residual mercury from scrap fluorescent lamp exhaust tubulation or similar scrap glass is disclosed. A very small predetermined amount of finely divided silica or alumina powder is added to the mercury contaminated scrap glass and the mixture is agitated for a very short predetermined time during which the mercury is stripped from the tubulation. The separated mercury, powder and glass mixture is then decanted through a screen of suitable mesh to remove the separated mercury and powder from the glass and the mercury is then rinsed with a suitable solvent to remove the oxide powder from the mercury.

8 Claims, 1 Drawing Figure

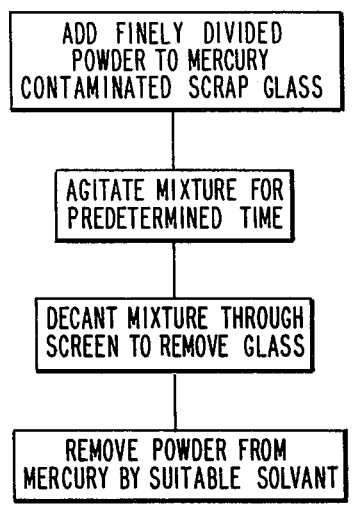

RECOVERY OF MERCURY FROM SCRAP GLASS

BACKGROUND OF THE INVENTION

In the manufacture of fluorescent lamps mercury is introduced into the lamp envelope through a thin glass tube or tubulation at one end of the lamp. The interior of the lamp is then exhausted through the same tubulation and the tubulation then tipped off or sealed, leaving an extended piece of scrap tubulation which in many instances is contaminated with droplets of mercury. A single fluorescent lamp factory can produce more than 750 pounds of such scrap tubulation each day and the amount of mercury in the scrap, tipped off, tubulations can amount to as much as 24 pounds per day. Scrap glass from a lamp making process is generally returned to the melt in the form of cullet but, of course, glass contaminated with mercury cannot be added to the glass melt but must be discarded. Additionally, care must be taken with respect to the disposal of the mercury contaminated scrap glass since mercury can contaminate the environment. In one prior art operation, part of the mercury is reclaimed from the tubing by centrifuging the contaminated exhaust tubes in water. Aside from giving low recovery rates, this method is expensive, subject to spillage and the possibility exists that through this wet process there can be mercury carry-over into the water which then enters the environment through the sewage system.

Since the tipped off exhaust tubing is the product of a melting process which seals the end of the tubulation still attached to the lamp, it also seals off one end of the scrap tubulation to form a very narrow elongated piece of tubing with only one end open. Attempting to recover the mercury from this tubulation with a wet process has been found to be less than adequate since apparently it is difficult for the liquid to enter the tubulation to perform the cleaning.

It has been found, surprisingly, that a dry process in which very finely divided powder, preferrably either silica or alumina, when added in very small quantities to the scrap glass tubulation and agitated for a very short period of time produces an almost aerosol effect in an enclosed container and quickly and efficiently separates the mercury from the interior of the glass tubulation.

SUMMARY OF THE INVENTION

In accordance with the present invention a method for removing mercury from scrap lamp exhaust tubing is provided which employs the steps of placing the mercury contaminated scrap glass in a suitable container, adding a predetermined amount of finely divided silica or alumina powder to the mercury contaminated scrap glass and then agitating the mixture of scrap glass and finely divided oxide powder for a predetermined time to strip the mercury from the glass. The separated mercury and scrap glass is then decanted through a screen of suitable mesh to remove the separated mercury from the glass. The mercury can be further purified by rinsing with a suitable solvent to remove the oxide powder from the mercury. It is preferred that the finely divided silica or alumina powder be added to the scrap glass in an amount of between about 0.05% and 0.5% by weight and that the mixture be agitated for a very short time period of preferably less than one minute.

BRIEF DESCRIPTION OF THE DRAWING

Many of the attendant advantages of the present invention will become more readily apparent and better understood as the following detailed description is considered in connection with the accompanying drawing in which the sole figure is a flow chart illustrating the process of this invention.

DESCRIPTION OF THE PREFERRED EMBODIMENT

Although the invention as hereinafter described is directed primarily to the removal of small quantities of mercury from the scrap exhaust tubulation which occurs in the manufacture of fluorescent lamps, it should be readily understood that the process would be equally applicable to any contaminated exhaust and fill tubulation which might occur during the manufacture of high pressure mercury or metal halide lamps as well as any other manufacturing process which produces mercury contaminated glass or small base metal tubing as a scrap by-product.

In accordance with the present invention, a very small quantity of finely divided, sub-micron size, silica or alumina powder is added to a container having therein a quantity of mercury contaminated scrap exhaust tubulation. Preferably, the finely divided silica or alumina is added in an amount of from between about 0.05% and 0.5% of the weight of the glass. The container is then rolled or tumbled for a minimum amount of time of from between about 10 and 60 seconds in order to accomplish complete dispersion of the finely divided oxide particles throughout the glass tubulation which will in effect strip the mercury from the glass, causing the mercury to collect in the bottom of the mixing vessel.

It should be understood that although the invention has been practiced successfully using oxides of aluminum and silicon other submicron size powders may be equally effective in providing the dusting necessary to remove the mercury from the glass. Possible other candidates for performing the dusting function are tricalcium phosphate powder and diatomacious earth in finely divided form.

A minimum amount of powder should be used consistent with the shortest possible agitation time in order to optimize the process. When excessive amounts of powder are used, it is both uneconomical and it can also cause a very fine dispersion of the mercury in the powder which can lead to greater problems in separating the mercury from the powder. The minimum amount of agitation time is desirable since the longer the agitation time the greater the glass breakage, complicating the step of removing the mercury from the scrap glass after separation of the two components.

The mercury-powder mix can be readily physically separated from the scrap glass tubing by conventional means such as decantation through a suitable screen. A plastic or stainless steel screen of about 40 mesh is preferable for separating the mercury-powder mix from the scrap glass tubing since the small balls of mercury will fall through the screen while the scrap glass except for a few slivers will be retained on the top of the screen.

The mercury-powder mixture can then be separated by use of a suitable solvent, depending on the nature of the silica or alumina powder used. For example, if hydrophobic silica powder is used, the powder can be removed from the mercury by the addition of such solvents as acetone, alcohol, or chloroethane, or by the addition of ammonia. If hydrophilic silica powder is employed, the hydrophilic silica disperses well in water, although additions of a small amount of mineral acid or acetic acid helps lifting the silica from the mercury. Ammonia or caustic solutions are also effective. In the case of hydrophilic alumina, useful separating agents are acetic acid, hydrochloric acid and ammonia.

After removal of the powder from the mercury, any small pieces of glass that may be present can be easily floated off by making use of the great difference in specific gravity between glass and mercury. If contamination free, high quality, mercury is desired as a by-product of this invention further, conventional, distillation processes may be employed.

As a specific example, about 300 grams of mercury contaminated exhaust tubing is disposed in a one gallon jar. About 0.2 grams (about 0.07% of the weight of the scrap glass) of hydrophobic silica is added to the jar and the jar is rolled for 20 seconds during which time the mercury is released from the tubing and collects in large drops in the bottom of the jar. After the mixture is decanted through a plastic or stainless steel screen of about 40 mesh, the mercury powder mixture is treated with acetone to lift the hydrophobic silica from the mercury in at least two rinses. The mercury is then ready for further purification, if required, and the collected glass, being free of mercury, may be returned to the glass melt in the form of a cullet.

As will be apparent from the foregoing, mercury retained in the scrap exhaust tubulation during the fluorescent lamp manufacturing process can be quickly and simply removed from the contaminated tubulation by the addition of very small quantities of finely divided silica or alumina powder in accordance with the present invention. The process returns a substantial quantity of previously unusable scrap glass back to the manufacturing process while separating the mercury for later reclamation of the mercury or the further judicial disposal of the mercury in a manner which will not contaminate the environment. Based upon the relative values of glass and mercury, the reclamation of the mercury is a significant factor. Of course, the solvent cleaning step is merely a preliminary step in the reclamation of mercury and further conventional distillation processing is required to produce high quality mercury.

What is claimed is:

1. A method for removing mercury from lamp exhaust tubing or similar scrap glass comprising the steps of:

placing the mercury contaminated scrap glass in a suitable container;

adding a predetermined amount of finely divided sub-micron size powder to the mercury contaminated scrap glass;

agitating the mixture of scrap glass and finely divided powder for a predetermined time to strip the mercury from the glass;

decanting the mixture through a screen of suitable mesh to remove the separated mercury from the glass; and rinsing the mercury with a suitable solvent to remove the powder from the mercury.

2. The method according to claim 1 wherein said predetermined amount of finely divided powder is from between about 0.05% and 0.5% of the weight of the scrap glass.

3. The method according to claim 1 wherein said predetermined time is from between about 10 and 60 seconds.

4. The method according to claim 1 wherein said predetermined time is about 20 seconds.

5. The method according to claim 1 wherein said predetermined amount of finely divided powder is about 0.07% by weight of the scrap glass.

6. The method according to claim 1 wherein said predetermined amount of finely divided powder is from between about 0.05% and 0.5% by weight of the scrap glass, and said predetermined time is less than one minute.

7. The method according to claim 1 wherein said finely divided powder is silica or alumina.

8. The method according to claim 1 wherein said finely divided powder is hydrophobic silica.

* * * * *